United States Patent [19]

Kawai et al.

[11] Patent Number: 4,573,709
[45] Date of Patent: Mar. 4, 1986

[54] LATCH DEVICE FOR A WEBBING ANCHOR

[75] Inventors: Osamu Kawai, Fujisawa; Kazuo Yamamoto, Sagamihara; Yoshihiro Yokote, Yokohama, all of Japan

[73] Assignee: NSK-Warner K.K., Tokyo, Japan

[21] Appl. No.: 618,135

[22] Filed: Jun. 7, 1984

[30] Foreign Application Priority Data

Jun. 21, 1983 [JP] Japan .............................. 58-94217[U]

[51] Int. Cl.⁴ ............................................. B60R 21/00
[52] U.S. Cl. .................................... 280/804; 280/801; 280/808; 297/486
[58] Field of Search ............... 280/802, 804, 807, 808, 280/803; 297/483, 486

[56] References Cited

U.S. PATENT DOCUMENTS

| | | | |
|---|---|---|---|
| 4,256,331 | 3/1981 | Schwanz et al. | 280/804 |
| 4,302,031 | 11/1981 | Nishimura et al. | 280/804 |
| 4,343,489 | 8/1982 | Suzuki et al. | 280/804 |
| 4,345,781 | 8/1982 | Suzuki et al. | 280/802 |
| 4,354,696 | 10/1982 | Volk et al. | 280/804 |
| 4,392,671 | 7/1983 | Fohl | 280/804 |

FOREIGN PATENT DOCUMENTS 52457 4/1980 Japan .

Primary Examiner—Richard A. Bertsch
Attorney, Agent, or Firm—Shapiro and Shapiro

[57] ABSTRACT

A latch device for a webbing anchor used in the seat belt system of a vehicle comprises a guide rail disposed in the vehicle with a predetermined locus, an anchor to which the end of webbing is fixed and which has an engaging pawl, the anchor being engaged with the guide rail for movement along the track of the guide rail, a driving member slidable along the guide rail and engaged with the anchor so as to be relatively displaced by a predetermined amount in the direction of sliding movement, the driving member being adapted to drive the anchor on the guide rail to bring the same to a seat occupant restraining position and a seat occupant non-restraining position, and a latch member fixedly disposed adjacent to the driving member and having an engaging portion engageable with the engaging pawl of the anchor and a cam portion forming cam means with the driving member.

7 Claims, 7 Drawing Figures

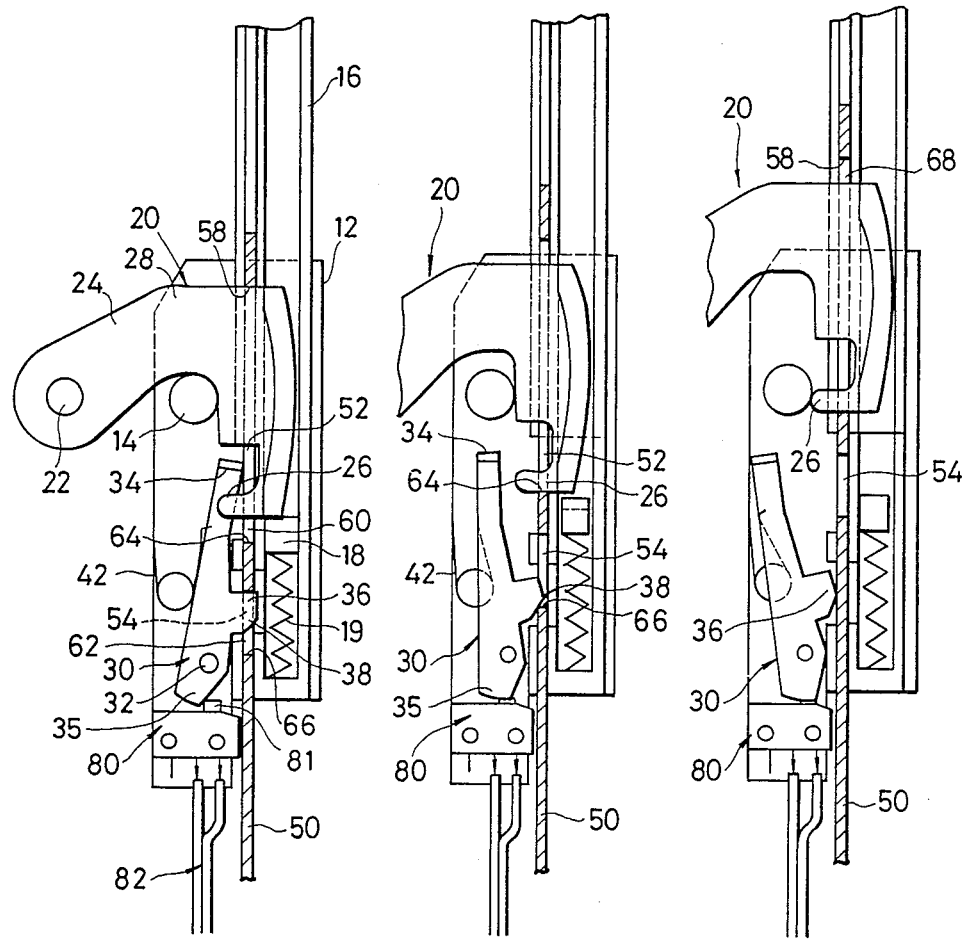

LATCH DEVICE FOR A WEBBING ANCHOR

BACKGROUND OF THE INVENTION

1. Field of the Invention

This invention relates to improvements in a latch device for a webbing anchor used in a seat belt system.

2. Description of the Prior Art

Seat belt systems of various types are adopted in automotive vehicles and the like, and the so-called passive type seat belt system is a typical example thereof. Among these seat belt systems, there is one of the type in which a portion of webbing is connected to an anchor movable along a guide rail and the anchor may be moved along the guide rail by a suitable driving member, whereby the webbing may assume a position in which it restrains the seat occupant or a position in which it does not restrain the seat occupant.

Now, when the anchor is moved toward one end of the guide rail and the webbing assumes the position in which it restrains the seat occupant, it is necessary that the anchor be held in that position. Otherwise, the anchor would move during the collision of the automotive vehicle, and the webbing could not completely restrain the seat occupant. As the reasons why the seat occupant cannot be restrained, there may be mentioned the following two cases: firstly, a case where the webbing moves to any other position than its regular position and becomes unable to restrain the seat occupant and secondly, a case where the anchor cannot completely receive the tension applied to the webbing and comes off (if there is only a slide rail, the anchor comes off the slide rail and may not receive the tension).

Therefore, in a seat belt system of the type in which an anchor is positioned at a vertical portion of a guide rail when a webbing is in a position in which it restrains a seat occupant, design is made such that an anchor bolt or the like receives the loads in longitudinal and lateral directions of a vehicle and latch means blocks vertical movement. On the other hand, in a seat belt system of the type in which an anchor is positioned at a horizontal portion of a guide rail when a webbing is in a position in which it restrains a seat occupant, design is made such that latch means blocks forward movement and an anchor bolt or the like blocks backward movement. In any case, however, the latch device of this type suffers from knotty problems.

That is, the latch device for the anchor must reliably lock the anchor during normal use and must quickly unlock the anchor during a desired time (when the seat occupant gets on and off the vehicle). Also, the anchor and the driving member for the anchor move near the face of the seat occupant along the guide rail and therefore are required to be compact and moreover move smoothly and with a small resistance. Furthermore, a latch member for locking the anchor is required to be compact and rigid. In contrast, the latch device for the anchor heretofore adopted includes a latch mechanism of complicated structure or the entire device is bulky and therefore, the anchor and its vicinity are complex in construction. When the anchor moves along the guide rail, that is, when the anchor passes a bending portion along the direction of movement of the vehicle body (hereinafter referred to as the "bending R portion") or a bending portion perpendicular to the direction of movement of the vehicle body (hereinafter referred to as the "camper portion"), the movement resistance becomes great, or smooth movement is hampered, and thus, it has been difficult to say that such latch device satisfies the above-mentioned requirements.

SUMMARY OF THE INVENTION

The present invention has been made with a view to eliminate the above-noted disadvantages peculiar to the prior art, that is, to provide a seat belt system including a latch device for an anchor which is compact and moreover capable of reliably effecting the locking and releasing of the anchor, and a driving member for the anchor which is simple and capable of achieving smooth movement.

For this purpose, in the present invention, latch means is constituted by the anchor and a latch member secured to the vehicle body side, and the latch member may be operated by the driving member.

The invention will become more fully apparent from the following detailed description thereof taken in conjunction with the accompanying drawings.

BRIEF DESCRIPTION OF THE DRAWINGS

FIG. 2 is a fragmentary, enlarged view of the same embodiment.

FIGS. 3, 4 and 5 illustrate the operation of the same embodiment.

DESCRIPTION OF THE PREFERRED EMBODIMENTS

The invention will hereinafter be described by reference to the drawings which show an embodiment thereof.

Figure 1:
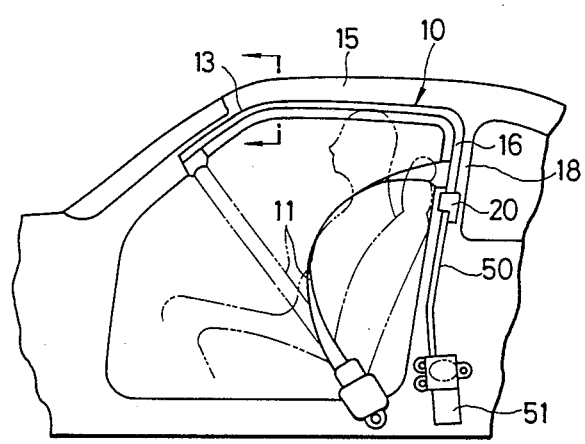
FIG. 1 is a front view showing a first embodiment of the present invention.

As shown in FIG. 1, a guide rail 10 has its front portion 13 disposed on the side roof 15 of an automotive vehicle along a predetermined locus and its rear portion 16 disposed along a center pillar 18, and an anchor 20 is movably mounted thereon. This anchor 20, as shown in FIG. 2, has a protruded portion 24 formed with an aperture 22 for connecting webbing 11, an engaging portion 26 for engaging a latch member 30 to be described, and an engaging portion 28 for engaging an anchor bolt 14. Also, the anchor 20 is designed such that its downward (as viewed in FIGS. 1 and 2) movement from a predetermined position is stopped by the anchor bolt 14 studded in a fixed base 12. A damper 18 biased upwardly by a spring 19 is provided in the guide rail 10 and is adapted to bear against the underside of the engaging portion 26 to thereby alleviate the shock during the collision of the anchor 20 with the anchor bolt 14.

Near the anchor bolt 14, a latch member 30 is mounted for pivotal movement about a shaft 32 secured to the base 12, and the free end thereof is provided with an engaging portion 34 engageable with the engaging portion 26 of the anchor 20. The latch member 30 is also provided with a protruded portion 36 on the right surface of the intermediate portion thereof and the inclined surface 38 of the protruded portion 36 provides a cam surface, and the latch member is biased rightwardly (as viewed in FIG. 2) by a spring 42.

The anchor 20 is mounted on a thick tape 50 as a driving member with a play in the lengthwise direction of the thick tape 50 and is movable along the guide rail 10. That is, the thick tape 50 is formed with a hole 52 longer than the lengthwise width of the portion of the anchor 20 which is contained in the thick tape 50, and the anchor 20 extends through this hole 52. Near the hole 52 (below the hole 52 as viewed in FIG. 2), the thick tape 50 is formed with a hole 54 into which the protruded portion 36 of the latch member 30 may fit. The thick tape 50, as shown in FIG. 1, may be driven lengthwise thereof by a motor 51. That is, the end portion of the thick tape 50 is adapted to be wound on and drawn out from a rotating member within the case of the motor 51.

A switch 80 is secured to the base 12 near the protruded portion 35 of the latch member 30, and the acting portion 81 thereof is engageable with the protruded portion 35. The switch 80 is connected to the motor 51 and to a lamp (not shown) for latch confirmation warning, and is opened when the acting portion 81 protrudes, and is closed when the acting portion 81 retracts.

Operation of the present embodiment will now be described.

FIG. 2 shows a case where the anchor 20 is rendered engageable with the latch member 30 and the webbing is restraining the seat occupant, and in this case, the anchor 20 is held in its shown position by the underside of the engaging portion 26 being in contact with the damper 18 and by the upper edge of the hole 52 of the thick tape 50 bearing against the upper surface of the engaging portion 26. The rightward and downward movement of the anchor 20 may be limited or blocked by the anchor bolt 14, and the upward movement of the anchor 20 along the guide rail 10 may be limited or blocked by the latch member 30 biased by a spring 42.

The latch member 30 is turned rightwardly by the action of the spring 42 and the protruded portion 36 enters the hole 54 of the thick tape 50. Therefore, the protruded portion 35 of the latch member 30 and the acting portion 81 of the switch 80 are not in engagement with each other and the switch 80 is open. Accordingly, the motor 51 is stopped and the warning lamp is turned on to inform that the anchor 20 and the latch member 30 are in their latched state.

Even if, in this state, an upward force along the guide rail 10 acts on the anchor 20, the anchor moves upwardly by an amount corresponding to the clearance between the upper surface of the engaging portion 26 thereof and the engaging portion 34 of the latch member 30 and the engaging portion 26 comes into engagement with the engaging portion 34, whereby the movement of the anchor is blocked and accordingly, the seat occupant is positively restrained.

In this manner, the latch member 30 and the switch 80 serve also as a sensor for confirming that the anchor 20 has come to its end of retraction and a sensor for warning that the anchor 20 and the latch member 30 have been positively latched.

At this time, a gap 60 is left on the lower edge 64 side of the hole 52 and a gap 62 is left on the lower edge 66 side of the hole 54.

When the door is then opened, the motor 51 is driven and an upward drive force is applied to the thick tape 50 by the motor 51, whereupon as shown in FIG. 3, only the thick tape 50 moves by an amount corresponding to the play 60 or 62 of the thick tape and, when the lower edge 64 of the hole 52 bears against the underside of the engaging portion 26, the anchor 20 moves upwardly and, when the lower edge 66 of the hole 54 comes into contact with the cam surface 38, the latch member 30 is turned leftwardly against the force of the spring 42.

When the latch member 30 is turned leftwardly, the protruded portion 35 thereof comes into engagement with the acting portion 81 of the switch 80 and the lamp is turned off to inform that the latched state has been released. When the gap between the upper surface of the engaging portion 26 of the anchor 20 in FIG. 2 and the underside of the engaging portion 34 of the latch member 30 is small, the lower edge 66 of the hole 54 of the thick tape 50 comes into contact with the cam surface 38 and turns the latch member leftwardly, whereafter the lower edge 64 of the hole 52 bears against the underside of the engaging portion 26 and moves the anchor 20 upwardly. In any case, such a structure is adopted that before the engaging portion 26 of the anchor 20 bears against the engaging portion 34 of the latch member 30, the lower edge 66 of the hole 54 of the thick tape comes into contact with the cam surface 38 to turn the latch member 30 leftwardly and bring about a non-engaged condition. As a result, the engaging portion 26 of the anchor 20 assumes a position in which it is unengageable with the engaging portion 34 of the latch member 30 and accordingly, if the thick tape 50 is continuedly moved upwardly, as shown in FIG. 4, the protruded portion 36 of the latch member 30 becomes positioned at the left side of the thick tape 50 and the anchor 20 is moved upwardly by the thick tape, whereby there is brought about a condition in which the webbing 11 does not restrain the seat occupant (the restraint of the seat occupant is released).

On the other hand, to return the webbing to a condition in which it restrains the seat occupant, the door is closed and the motor is caused to revolve in the reverse direction to thereby move the thick tape 50 in the opposite direction. Thereupon, the gap 68 is clogged at first and thereafter, the side edge 58 of the hole 52 bears against the anchor 20 and thus, the anchor 20 is moved by the thick tape 50.

Figure 5:
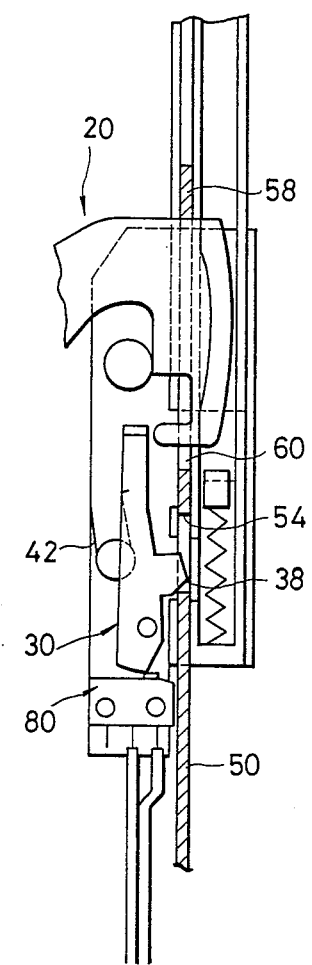

When the anchor 20 and the thick tape 50 are further moved downwardly to bring about a position as shown in FIG. 5 wherein the protruded portion 36 can fit into the hole 54, the latch member 30 is turned rightwardly by the action of the spring 42 and, as shown in FIG. 2, the protruded portion 34 restores the condition in which it is engageable with the engaging portion 26 of the anchor 20, and the latch member 30 is turned rightwardly and thus, the latch member 30 and the anchor 20 become latched, whereby the webbing assumes the condition in which it restrains the seat occupant.

When the latch member 30 is turned rightwardly, the switch 80 becomes open and the motor 51 is stopped while, at the same time, the lamp for latch warning is turned on.

In contrast, in a latch wherein a release member or the like in the form of a projection is mounted on a thick tape as in the prior art, the latch is normally turned rightwardly and is turned leftwardly only when the release member passes, and returns to the rightwardly turned state in the latched condition. Accordingly, a single switch cannot be used both for latch confirmation and for the end of the retraction of the anchor. Even if an attempt is made to use a single switch both for latch confirmation and for the end of the retraction of the anchor, the number of parts will be increased and the structure will become complicated.

The dimensional relation between the sizes of the holes 52 and 54 of the thick tape 50 and the gap between the anchor 20 and the latch member 30 will now be described. In FIG. 2, when the size of the gap between the engaging portion 26 of the anchor 20 and the engaging portion 34 of the latch member 30 is A and the difference between the size of the gap 60 between the underside of the engaging portion 26 of the anchor 20 and the lower edge of the hole 52 of the thick tape 50, i.e., the lengthwise width of the anchor 20, and the lengthwise width of the hole 52 is B and the size of the gap 62 between the lower edge 64 of the hole 54 of the thick tape 50 and the foremost contact portion of the cam surface 38 of the protruded portion 36 of the latch member 30 is C and the stroke of the thick tape 50 necessary to move the engaging portion 34 of the latch member 30 from a position in which it is engageable with the engaging portion 26 of the anchor 20 to a position in which it is unengageable with the engaging portion 26 is D, then it is necessary that $C<A<C+D$ and $A+B>C+D$. Also, in FIG. 5, it is necessary to determine the dimensions and position of the hole 54 so that the latch member 30 is not turned rightwardly to bear against the underside of the engaging portion 26 of the anchor 20 when the anchor 20 and the latch member 30 come into engagement with each other.

In the present embodiment, as described above, the anchor 20 and the latch member 30 are disposed in the same direction as the driving direction of the thick tape 50 and the latch member 30 as well as the anchor 20 is designed to be rotated by the thick tape 50 and therefore, the necessity of providing any special driving means to rotate the latch member is eliminated. Accordingly, the vicinity of the anchor 20 is simple in construction. Also, the anchor 20 is provided with no accessory and therefore, particularly the bending R portion and camper portion of the guide rail 10 in which the movement resistance has heretofore been great can be moved smoothly and the whole device is compact.

Figure 6:
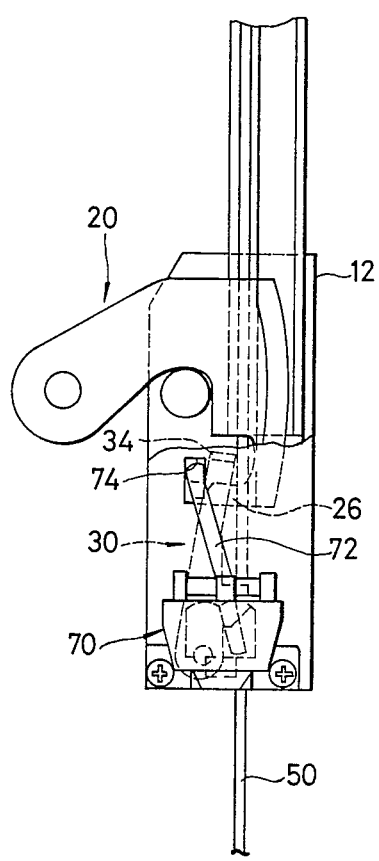
FIG. 6 is a front view of a second embodiment of the present invention.
Figure 7:
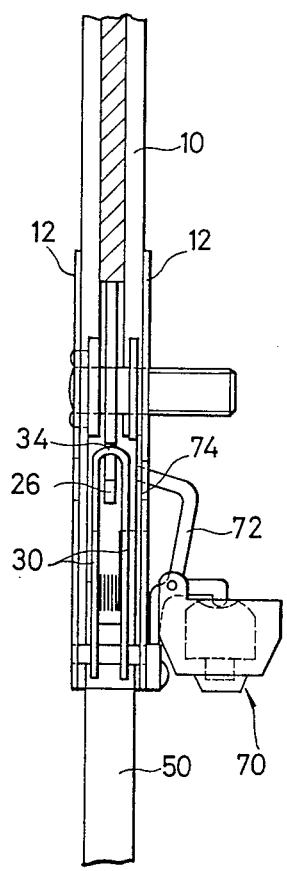
FIG. 7 is a side view of the second embodiment.

Another embodiment of the present invention will now be described by reference to FIGS. 6 and 7. This embodiment differs from the above-described embodiment in that rotation of the latch member 30 is blocked when an acceleration sensor 70 operates. The acceleration sensor 70 is of the well-known type in which the arm 72 thereof is adapted to turn leftwardly as viewed in FIG. 7 when the sensor senses an acceleration imparted to the vehicle body. Describing it more fully, when the acceleration sensor 70 detects an acceration (for example, during collision) in a state in which the engaging portion 26 of the anchor 20 is engageable with the engaging portion 34 of the latch member 30, that is, in a seat occupant restraining state, the arm 72 turns leftwardly (as viewed in FIG. 7) and the free end thereof fits into a cutaway 74. As a result, the arm 72 comes into the side of the latch member 30 and blocks the leftward turning of the latch member 30 by receiving a force tending to turn the latch member 30 leftwardly by the base 12. Accordingly, even if the thick tape 50 moves upwardly (as viewed in FIG. 6), the latch member 30 will not be rotated by the thick tape 50 and the seat occupant will be positively restrained by the webbing. Design may also be made such that when the anchor 20 is not in engagement with the latch member 30, the arm 72 of the sensor 70 bears against the latch member 30 and cannot turn leftwardly.

What has been described above is merely a part of an embodiment of the present invention and of course, the present invention should never be restricted thereto. That is, the specific construction (shape, latch system, etc.) of the anchor and/or the latch member may be suitably improved or changed without departing from the spirit of the present invention.

While the foregoing description has been made with respect to a case where the movement to the front of the vehicle body is blocked by the anchor bolt 14, a similar effect may also be obtained by sliding the anchor not into the anchor bolt but into other conventional means such as a plate bent into a U-shape. Also, where for example, a non-bent guide rail is used, the restraining means of the anchor bolt need not be employed, but the latch device for the anchor 20 may be provided only by the latch member 30.

Thus, according to the present invention, the anchor rotation can be formed only by the anchor and the driving member and therefore, the disadvantage of the prior art that the movement resistance becomes great when the anchor passes the bending R portion and the camper portion of the guide rail can be overcome and moreover, nimble movability of the anchor can be obtained. Also, the latch means is comprised of only the anchor and the latch member which are indispensable to the latch device of the anchor, and this leads to the obtainment of the effect that the entire device is compact and moreover a reliable latch device for the anchor can be obtained.

We claim:

1. A latch device for a webbing anchor used in the seat belt system of a vehicle, said device comprising:
   a guide rail disposed in the vehicle with a predetermined locus;
   an anchor to which the end of webbing is fixed and which has an engaging pawl, said anchor being engaged with said guide rail for movement along the track of said guide rail;
   a driving member slidable along said guide rail and engaged with said anchor so as to be relatively displaced by a predetermined amount in the direction of sliding movement, said driving member having a hole, said driving member being adapted to drive said anchor on said guide rail to bring the same to a seat occupant restraining position and a seat occupant non-restraining position; and
   a latch member fixedly disposed adjacent to said driving member and having an engaging portion engageable with the engaging pawl of said anchor and a cam portion forming cam means with said driving member,
   said cam portion being formed so that it fits into the hole of said driving member as said anchor is driven to said seat occupant restraining position by said driving member, and is further displaced in said hole relative to the driving member of a predetermined length, and that it is pushed out of said hole thereafter as said anchor is driven away from said seat occupant restraining position by said driving member;
   said engaging portion coming to a position in which it is engageable with the engaging pawl of said anchor by said fitting and said displacement of said cam portion and coming to a position in which it is unengageable with the engaging pawl of said anchor by said displacement and said push-out of said cam portion, said engaging portion being adapted to be engaged with the engaging pawl of said anchor by a load of a predetermined value or more applied to said anchor through the webbing, and
   wherein said latch member is an arm held on a shaft and swingable between a position close to said driving member and a position spaced apart from said driving member, said latch member is normally biased toward said driving member, said arm has said engaging portion at the fore end thereof and a cam portion at a portion thereof opposed to said driving member, said guide rail has an internal path extending in the lengthwise direction thereof and parallel to the track for said anchor, said driving member is a tape having one end thereof inserted into the internal path of said guide rail and the other end thereof coupled to a motor and is slid in said guide rail by the drive of said motor, said anchor has its webbing fixing portion protruding from the track for said anchor through a hole provided near said one end of said tape, and the engaging pawl thereof is projectedly provided on the side on which said latch member is disposed.

2. A latch device according to claim 1, wherein said guide rail extends longitudinally of the vehicle and is bent so as to face upwardly and downwardly behind the vehicle and the end of the bend provides the seat occupant restraining position of said anchor, said anchor when in the seat occupant restraining position has its engaging pawl extending through said hole of said tape below the webbing fixing portion, said tape has a hole for the cam portion of said arm below the hole for said anchor, and said arm is fixed near the end of the bend of said guide rail with the engaging portion thereof facing upwardly.

3. A latch device according to claim 2, wherein the hole for the anchor and the hole for the cam provided in said tape are such that when the cam member is completely pushed out of the hole for the cam, the hole for the anchor has a predetermined amount of gap between it and said anchor so that the engaging pawl of said anchor is not engaged with the engaging portion of said arm.

4. A latch device for a webbing anchor used in the seat belt system of a vehicle, said device comprising:
   a guide rail disposed in the vehicle with a predetermined locus;
   an anchor to which the end of webbing is fixed and which has an engaging pawl, said anchor being engaged with said guide rail for movement along the track of said guide rail;
   a driving member slidable along said guide rail and engaged with said anchor so as to be relatively displaced by a predetermined amount in the direction of sliding movement, said driving member having a hole, said driving member being adapted to drive said anchor on said guide rail to bring the same to a seat occupant restraining position and a seat occupant non-restraining position;
   a latch member fixedly disposed adjacent to said driving member and having an engaging portion engageable with the engaging pawl of said anchor and a cam portion forming cam means with said driving member,
   said cam portion being formed so that it fits into the hole of said driving member as said anchor is driven to said seat occupant restraining position by said driving member, and is further displaced in said hole relative to the driving member of a predetermined length, and that it is pushed out of said hole thereafter as said anchor is driven away from said seat occupant restraining position by said driving member;
   said engaging portion coming to a position in which it is engageable with the engaging pawl of said anchor by said fitting and said displacement of said cam portion and coming to a position in which it is unengageable with the engaging pawl of said anchor by said displacement and said push-out of said cam portion, said engaging portion being adapted to be engaged with the engaging pawl of said anchor by a load of a predetermined value or more applied to said anchor through the webbing; and
   shock absorbing means for engaging a portion of said anchor when said anchor is moved to the seat occupant restraining position and absorbing the shock created until said anchor reaches said position, and wherein said shock absorbing means is a damper having a spring disposed at the end portion of said guide rail with respect to the direction of movement of said anchor to the seat occupant restraining position.

5. A latch device for a webbing anchor used in the seat belt system of a vehicle, said device comprising:
   a guide rail disposed in the vehicle with a predetermined locus;
   an anchor to which the end of webbing is fixed and which has an engaging pawl, said anchor being engaged with said guide rail for movement along the track of said guide rail;
   a driving member slidable along said guide rail and engaged with said anchor so as to be relatively displaced by a predetermined amount in the direction of sliding movement, said driving member having a hole, said driving member being adapted to drive said anchor on said guide rail to bring the same to a seat occupant restraining position and a seat occupant non-restraining position;
   a latch member fixedly disposed adjacent to said driving member and having an engaging portion engageable with the engaging pawl of said anchor and a cam portion forming cam means with said driving member, said cam portion being formed so that it fits into the hole of said driving member as said anchor is driven to said seat occupant restraining position by said driving member, and is further displaced in said hole relative to the driving member of a predetermined length, and that it is pushed out of said hole thereafter as said anchor is driven away from said seat occupant restraining position by said driving member;
   said engaging portion coming to a position in which it is engageable with the engaging pawl of said anchor by said fitting and said displacement of said cam portion and coming to a position in which it is unengageable with the engaging pawl of said anchor by said displacement and said push-out of said cam portion, said engaging portion being adapted to be engaged with the engaging pawl of said anchor by a load of a predetermined value or more applied to said anchor through the webbing; and
   detecting means for detecting the insertion and fitting of said latch member into said anchor and controlling the sliding movement of said driving member.

6. A latch device according to claim 5, wherein said latch member is an arm having at one end thereof an engaging portion engaged with said anchor, at the other end thereof an engaging portion engaged with said detecting means, and a cam portion at the intermediate portion thereof, said arm is supported on a shaft between the opposite ends thereof, and the opposite ends of said arm are swung by the fitting of said arm into the hole of said cam portion and the push-out of said arm from said hole, whereby the engaging portions at said opposite ends are displaced and as a result, said arm is displaced between a position in which it is engageable with said anchor and a position in which it is unengageable with said anchor, and operates said detecting means, checks the sliding movement of said driving member and operates an alarm.

7. A latch device for a webbing anchor used in the seat belt system of a vehicle, said device comprising:

a guide rail disposed in the vehicle with a predetermined locus;

an anchor to which the end of webbing is fixed and which has an engaging pawl, said anchor being engaged with said guide rail for movement along the track of said guide rail;

a driving member slidable along said guide rail and engaged with said anchor so as to be relatively displaced by a predetermined amount in the direction of sliding movement, said driving member having a hole, said driving member being adapted to drive said anchor on said rail to bring the same to a seat occupant restraining position and a seat occupant non-restraining position;

a latch member fixedly disposed adjacent to said driving member and having an engaging portion engageable with the engaging pawl of said anchor and a cam portion forming cam means with said driving member, said cam portion being formed so that it fits into the hole of said driving member as said anchor is driven to said seat occupant restraining position by said driving member, and is further displaced in said hole relative to the driving member of a predetermined length, and that it is pushed out of said hole thereafter as said anchor is driven away from said seat occupant restraining position by said driving member;

said engaging portion coming to a position in which it is engageable with the engaging pawl of said anchor by said fitting and said displacement of said cam portion and coming to a position in which it is unengageable with the engaging pawl of said anchor by said displacement and said push-out of said cam portion, said engaging portion being adapted to be engaged with the engaging pawl of said anchor by a load of a predetermined value or more applied to said anchor through the webbing; and locking means disposed adjacent to said latch member for holding said latch member in engagement with said anchor during emergency.

* * * * *